Feb. 7, 1939.  R. A. SANDBERG  2,146,130
BRAKE LEVER CONSTRUCTION
Filed April 5, 1937   2 Sheets-Sheet 1
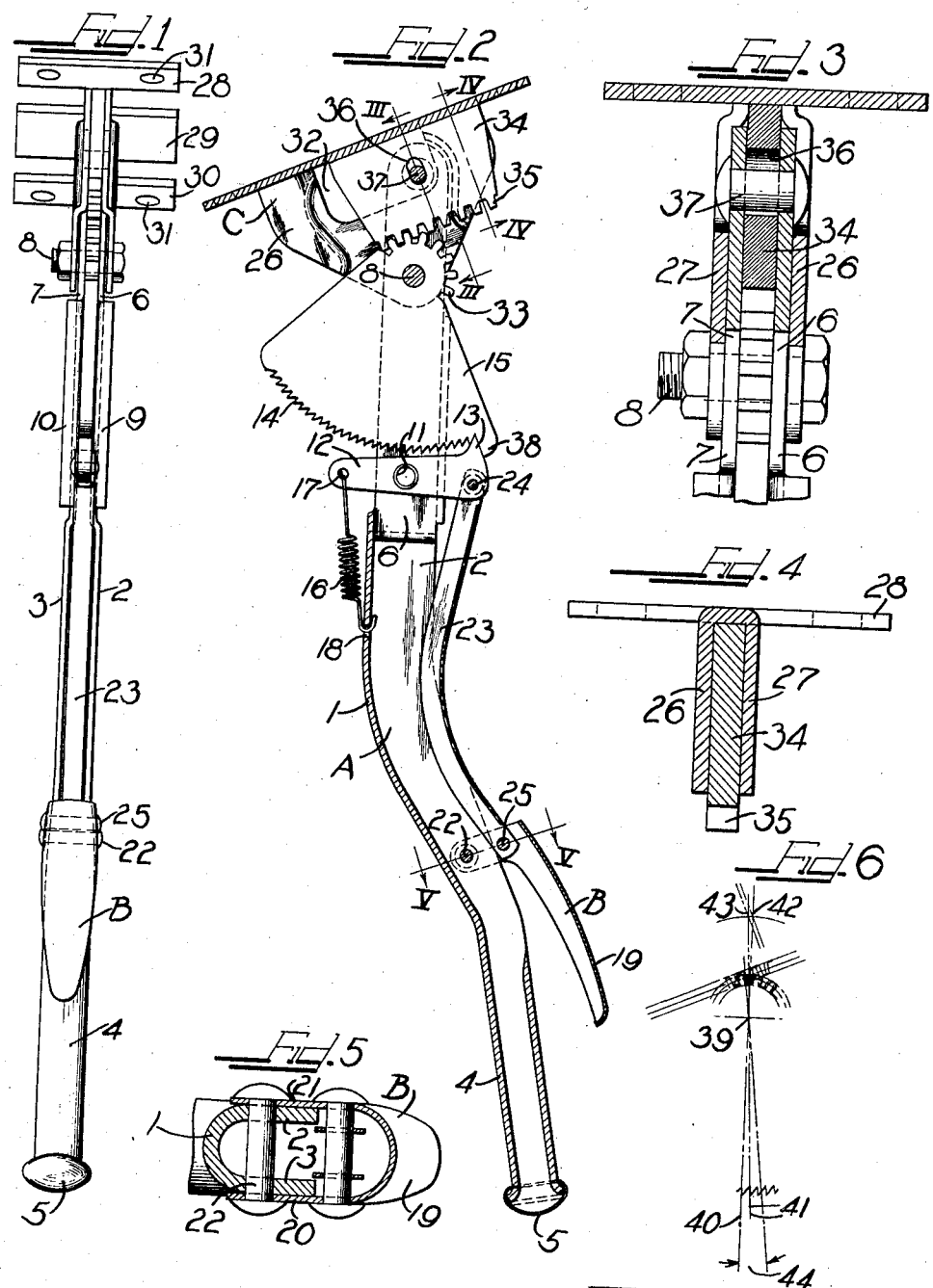
Inventor
RAY A. SANDBERG

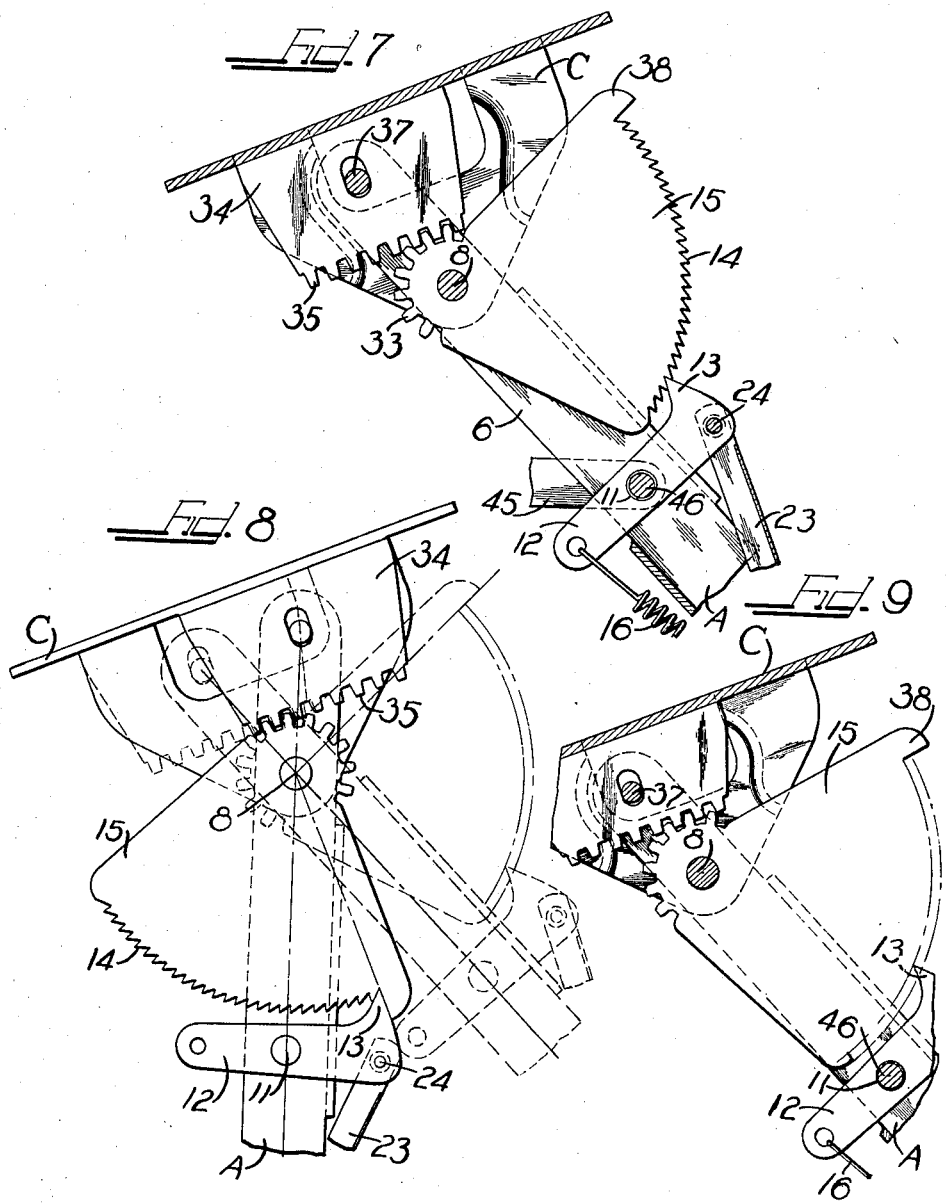

Patented Feb. 7, 1939

2,146,130

UNITED STATES PATENT OFFICE 2,146,130

BRAKE LEVER CONSTRUCTION

Ray A. Sandberg, Waukegan, Ill., assignor, by mesne assignments, to Houdaille-Hershey Corporation, Detroit, Mich., a corporation of Michigan Application April 5, 1937, Serial No. 134,945

10 Claims. (Cl. 74—537)

The object of the present invention is to provide a brake lever construction, of the pawl and ratchet type, wherein the ratchet teeth may be formed from a stamped piece of material, of such construction that the teeth will withstand braking action for a long period of time without deformation or impairment.

Another object of the present invention is to provide a ratchet type brake lever construction wherein relative movement between the ratchet and pawl is achieved for the purpose of securing finer adjustment of the brake lever and wherein the tooth construction is rugged and strong.

Another object of the present invention is to provide a brake lever construction with a swinging ratchet so related to the pawl that the ratchet teeth are moved with respect to the pawl in order to provide a fine adjustment of the pawl and ratchet teeth irrespective of the size of the ratchet teeth.

A still further object of the present invention is to provide a brake lever construction wherein the relative movement between the pawl and ratchet is secured by movement of the ratchet as the lever is swung in service, so that differential movement of the ratchet and pawl is achieved whereby movement of the ratchet makes it possible to move the lever, to advance the pawl from tooth to tooth of the ratchet, a distance less than the distance between the crests of any two adjacent ratchet teeth, for the purpose of securing fine adjustment of the lever.

Generally speaking, the present invention contemplates an oscillatable ratchet sector which is pivotally mounted on the lever pivot and which is given oscillatory movement by a rack, meshing with the sector, operable by the swing of the lever about its pivot. For the purpose of swinging the ratchet relatively to the pawl, the ratchet teeth are advanced at a greater rate of angular speed than the pawl, whenever the lever is swung in service.

The above, other, and further objects of the present invention will be apparent from the following description and accompanying drawings. The accompanying drawings illustrate an embodiment of the present invention, and the views thereof are as follows:

Figure 1 is an end elevational view of a brake lever constructed in accordance with the principles of the present invention;

Figure 2 is a view, partially in longitudinal section and partially in elevation, of the lever of Figure 1, showing the same in normal or "off" position;

Figure 3 is an enlarged sectional view taken substantially in the plane indicated by line III—III of Figure 2;

Figure 4 is an enlarged sectional view taken substantially in the plane indicated by the line IV—IV of Figure 2;

Figure 5 is an enlarged transverse sectional view taken substantially in the plane indicated by line V—V of Figure 2;

Figure 6 is a diagrammatic view showing the differential movement of the ratchet and pawl when the lever carrying the pawl is moved a distance equal to that between the crests of any two adjacent teeth of the ratchet;

Figure 7 is a fragmental view, partially in section and partially in elevation of the lever of Figure 2 swung to "set" position and showing the relationship of the parts in this position;

Figure 8 is a schematic view showing the extent of swing of the ratchet sector as the lever is swung through its limit of travel, and showing the difference in angular displacement of the ratchet sector with respect to the lever; and Figure 9 is a view similar to Figure 8 wherein the distance between the center of the lever pivot and the center of connection of the lever to the movable rack is less than the corresponding distance of these parts in the other figures, and showing the amplitude of swing of the ratchet sector under the conditions mentioned.

The drawings will now be explained.

The lever A is formed as a stamping with a shank of channel of U-shape providing a web portion 1 and side walls 2 and 3. The lower end of the lever is formed as a substantially cylindrical grip 4, the lower extremity of which is closed by a cap 5 crimped over the outturned extremity of the grip portion. Above the shank portion of the lever are parallel legs 6 and 7 which are apertured to receive a pivot pin or bolt 8, which is disposed downwardly from the upper extremity of the lever, as illustrated in the drawings. Between the lever pivot 8 and the channel shaped shank of the lever, the margins of the legs are outturned at 9 and 10 to afford strength to the legs.

Pivoted to the lever, by means of a tubular pivot 11, is a pawl 12 having at one end a point 13 for cooperating with the ratchet teeth 14 formed on an adjacent margin of a swinging sector plate 15 which oscillates about the lever pivot 8.

The pawl is held in engagement with the ratchet by means of a spring 16, one end of which is passed through an opening 17 in an end of the pawl and the other end of which is passed through an opening 18 in the web 1 of the lever.

For unlatching the pawl from engagement with the ratchet, a latch release member B, comprising a stamping forming a palm engaging portion 19 and parallel ears 20 and 21, overlaps the side walls of the shank and is pivoted at 22 to the lever, for rocking movement. Connected between the pawl 12 and the pawl release member B is a generally U-shaped member 23 pivoted to the pawl at 24 and to the pawl release member B at 25. The member 23 works within the channel shaped shank of the lever with its web in opposition to the web 1 of the lever. The action of the spring 16 in holding the pawl in latched engagement with the ratchet normally maintains the member 23 and pawl release member B in one position.

The lever is pivoted in operative relation to an attaching bracket, designated generally at C, which preferably is shaped from a stamping formed from flat metal stock, and bent to provide side walls 26 and 27 which are spaced from each other and which are apertured to receive the lever pivot 8. The supporting bracket C has outstanding portions 28, 29, and 30, certain of which (to wit, 28 and 30) are apertured at 31 to receive screws, bolts, rivets, or the like for securing the member C in fixed position behind the instrument board of an automotive vehicle. The portions of the attaching member C, lying between the parts 28 and 29, and 29 and 30, appear as illustrated in Figure 4. Such portions of the walls 26 and 27, between the parts 28 and 29, and 29 and 30, are formed by cutting certain portions of the stock when the member is made. The part 29 is formed by cutting out portions indicated by the openings 32, in Figure 2. Surrounding the openings 32, the walls are bulged to together form a pocket for the upper portion of the swinging sector 15.

The swinging sector 15 is formed with gear teeth 33, constituting a pinion, or mutilated pinion, as an integral part of the member 15.

Sliding against the underside of the parts 28, 29, and 30 of the attaching bracket member C, and between the side walls, is a rack 34 having rack teeth 35 in mesh with teeth 33 of the pinion portion of the oscillating ratchet member 15. The rack 34 is provided with an elongated slot 36 through which passes a pin 37 secured to the upper ends of the legs 6 and 7 of the lever. The pin 37 works within the openings 32 formed in the side walls of the member C, as may be readily observed from the drawings.

The upper ends of the legs of the lever work within the depressions or pockets formed by the bulges in the side walls 26 and 27 of the attaching member C.

The swinging sector 15 is provided with an abutment 38 which rests against the point 13 of the pawl when the lever is in its normal or "off" position, as illustrated in Figure 2.

Figure 2 shows the parts with the lever in "off" position.

When it is desired to swing the lever to "set" position, which is that of Figure 7, the operator grasps the grip portion 4 of the lever and swings it in counterclockwise direction.

Such swinging movement of the lever causes the rack 34 to move to the left, as viewed in Figure 2, thus swinging the ratchet member 15 in counterclockwise direction.

Because of the fact that the distance between the center of the ratchet pivot 8 and the pin 37 connecting the lever to the rack is less than the distance from the center of the lever pivot 8 to the ratchet teeth 14 of the ratchet member 15, the ratchet teeth will be moved past the point 13 of the pawl, in the same direction of angular movement, but at a greater rate of speed.

Due to the lack of space available for swinging movement of a dash type brake lever in automotive vehicles, the maximum amount of swing possible is somewhere between 40 and 45°.

Figure 7 shows the lever A swung 45°, in counterclockwise direction, from its position of Figure 2.

Referring to Figure 8, in full lines are shown the relative positions of the lever, pawl, swinging ratchet sector 15, and rack 34, when the lever is in "off" position. In dotted lines, the parts appear in the relationship of the same when the lever has been swung to "set" position.

It will be observed that the swing of the lever from full line to dotted line position of Figure 8 is approximately 45°, while the swing of the ratchet member 15 from full line to dotted line position is in excess of 45°. As shown, the swing of the ratchet member is approximately 100° from full line to dotted position of Figure 8.

It will at once be apparent that because the ratchet member 15 is swung at a greater rate of angular speed than the lever, the ratchet teeth move past the point 13 of the pawl at a greater rate of speed than the point is being moved. This differential movement means that as the lever A is swung a distance comparable to the distance between the crests of any two adjacent ratchet teeth of the member 15, the ratchet member will have been swung a greater distance.

This is illustrated diagrammatically in Figure 6.

Referring to Figure 6, 39 represents the lever pivot 8. The line 40 is the center line of the lever, through the lever center 39, when the lever is in "off" position.

The angle between the lines 40 and 41 represents a lever swing which in angular distance is that of the distance between the crests of two adjacent teeth of the ratchet member 15. During the swing of the lever from the position 39—40 to 39—41, the pivot 37, connecting the upper end of the lever to the rack 34, moves from point 42 to point 43, swinging the ratchet member represented by the angle indicated at 44.

Thus it will be observed that as the lever is moved to move the point 13 of the pawl a distance equal to the distance between the crests of any two ratchet teeth, the ratchet member is advanced, in the same direction as the swing of the lever, a distance over twice that between the crests of any two adjacent ratchet teeth.

Thus it is possible to secure a very fine latching engagement between the pawl and the ratchet.

In Figure 9 the distance between the centers of the lever and ratchet sector pivot and the connection of the lever to the rack is less than it is in the other figures. Referring to Figure 9, it will be observed that as the lever is swung through an angle of approximately 45°, the ratchet sector is swung through an arc of approximately 80° to 90°. Thus by changing the distance between the lever pivot and the point of connection of the lever to the rack, it is possible to secure any desired rate of swing of the ratchet with respect to the rate of swing of the lever. The farther the connection between the lever and rack is from the center of the lever pivot, the greater the amplitude of swing of the sector and the consequent greater rate of swing of the sector. Conversely, the nearer the centers are together there is a corresponding reduction in amplitude of swing of the ratchet sector and also its rate of swing.

A yoke or clevis 45 is shown as connected to the lever at the pivot of the pawl. When the yoke or clevis is so connected, a pin 46 is slipped through the tubular pivotal connection 11 with its ends engaging the clevis to thus connect it to the lever. The clevis or yoke 45 is connected by means of a cable or like connection to the brake mechanism of the vehicle.

The invention is claimed as follows:

1. Brake lever construction including a support, a lever pivoted to said support to swing, a ratchet sector pivoted on the lever pivot for oscillation, pawl means carried by the lever for cooperative engagement with the ratchet sector to latch the lever in adjusted position, and rack and pinion means to oscillate said ratchet sector to swing said sector in the same angular direction as the direction of the swing of the lever but at a greater rate of speed.

2. Brake lever construction including a support, a lever pivoted to said support to swing, a ratchet sector pivoted on the lever pivot for oscillation and provided with a series of ratchet teeth, pawl means carried by the lever for cooperative engagement with the ratchet sector to latch the lever in adjusted position, and means operated by the swing of the lever to swing said sector in such direction that the ratchet teeth move in the same angular direction as the lever swing and at a greater rate of speed.

3. A brake lever construction including a support, a lever pivoted to said support to swing, a ratchet sector and pinion pivoted on the lever pivot, a rack meshing with said pinion, and means connecting said lever and rack for moving said rack as said lever is swung about its pivot, the construction being such that movement of the rack caused by the swing of the lever rocks said sector in the same direction as the direction of the lever but at a greater rate of speed.

4. Brake lever construction including a support, a lever pivoted to said support to swing, an oscillatable ratchet sector pivoted on the lever pivot and capable of movement with respect to the lever, a pawl pivoted to said lever to latch with said ratchet, and a rack slidable by swing of said lever, said rack and sector having intermeshing members for rocking said sector as said rack is slid.

5. In a brake lever construction, a support, a lever pivoted to said support to swing on an axis spaced from both ends of the lever and arranged nearer one end of the lever, a sector rockable on the lever pivot and having ratchet teeth lying on the opposite side of the pivot from said one end of said lever, said sector having gear teeth lying between said lever pivot and said one end of said lever, a rack meshing with said gear teeth and connected to said one end of said lever for rocking said sector as said lever is swung, and a pawl pivoted on said lever for latching engagement with the ratchet, the construction being such that the distance of the ratchet teeth from the lever pivot is greater than the distance of the gear teeth from the lever pivot whereby slight angular movement of the gear teeth will swing the ratchet teeth a greater angular distance.

6. Brake lever construction including a support, a lever pivoted to said support to swing, a ratchet element swingable on the lever pivot, a pawl carried by said lever for latching engagement with said ratchet, said ratchet element having gear teeth disposed thereon on the opposite side of the lever pivot from the ratchet teeth, a sliding rack meshing with said gear teeth, and connections between the lever and rack for moving the rack as the lever is swung to rock the sector so as to move the ratchet teeth with respect to the pawl.

7. Brake lever construction including a support, a lever pivoted to said support to swing, a ratchet element swingable on the lever pivot, a pawl carried by said lever for latching engagement with said ratchet, said ratchet element having gear teeth disposed thereon on the opposite side of the lever pivot from the ratchet teeth, a sliding rack meshing with said gear teeth, and connections between the lever and rack for moving the rack as the lever is swung to rock the sector so as to move the ratchet teeth with respect to the pawl and in the same direction of angular movement as the direction of swing of the lever.

8. In combination, a lever construction including a support; a lever member pivoted to said support; a rockable member pivoted to said lever pivot and having ratchet teeth along an edge portion; a pawl pivoted to said lever for latching engagement with the ratchet teeth; and means having positive driving connection with said rockable member and operable by the swing of the lever for rocking said rockable member in the same angular direction as that of the lever swing but at a differential speed, for varying the rate of relative movement of the pawl and ratchet teeth.

9. A dash type brake lever construction including a fixed support, a lever pivoted to said support at a point below the upper end of the lever, a rockable member pivoted on the lever pivot and having ratchet teeth along an edge portion below the lever pivot, a pawl pivoted to said lever and having a tooth for latching engagement with the ratchet, and a slidable member pivoted to the upper end of said lever and having intermeshing tooth engagement with said rockable member above the lever pivot, the construction being such that the swing of the lever about its pivot in one direction causes sliding of said slidable member in a direction to swing the rockable member about its pivot in the same angular direction as the direction of swing of the lever to move the ratchet teeth past the pawl tooth at a greater rate of speed than that at which the pawl is moved by the swing of the lever.

10. Brake construction including a support, a lever pivoted to said support to swing, an oscillatable member pivoted on the lever pivot and having a clutching surface, a member carried by said lever and having clutching means engageable with said clutching surface of said oscillatable member to hold the lever in adjusted position, and means operated by the swing of the lever to swing said oscillatable member in such direction that its clutching surface is moved in the same angular direction as the lever swing but at a greater rate of speed.

RAY A. SANDBERG.